Aug. 8, 1950 C. R. BUSCH 2,518,120
SLACK ADJUSTER FOR BRAKES
Filed July 19, 1945 3 Sheets-Sheet 1
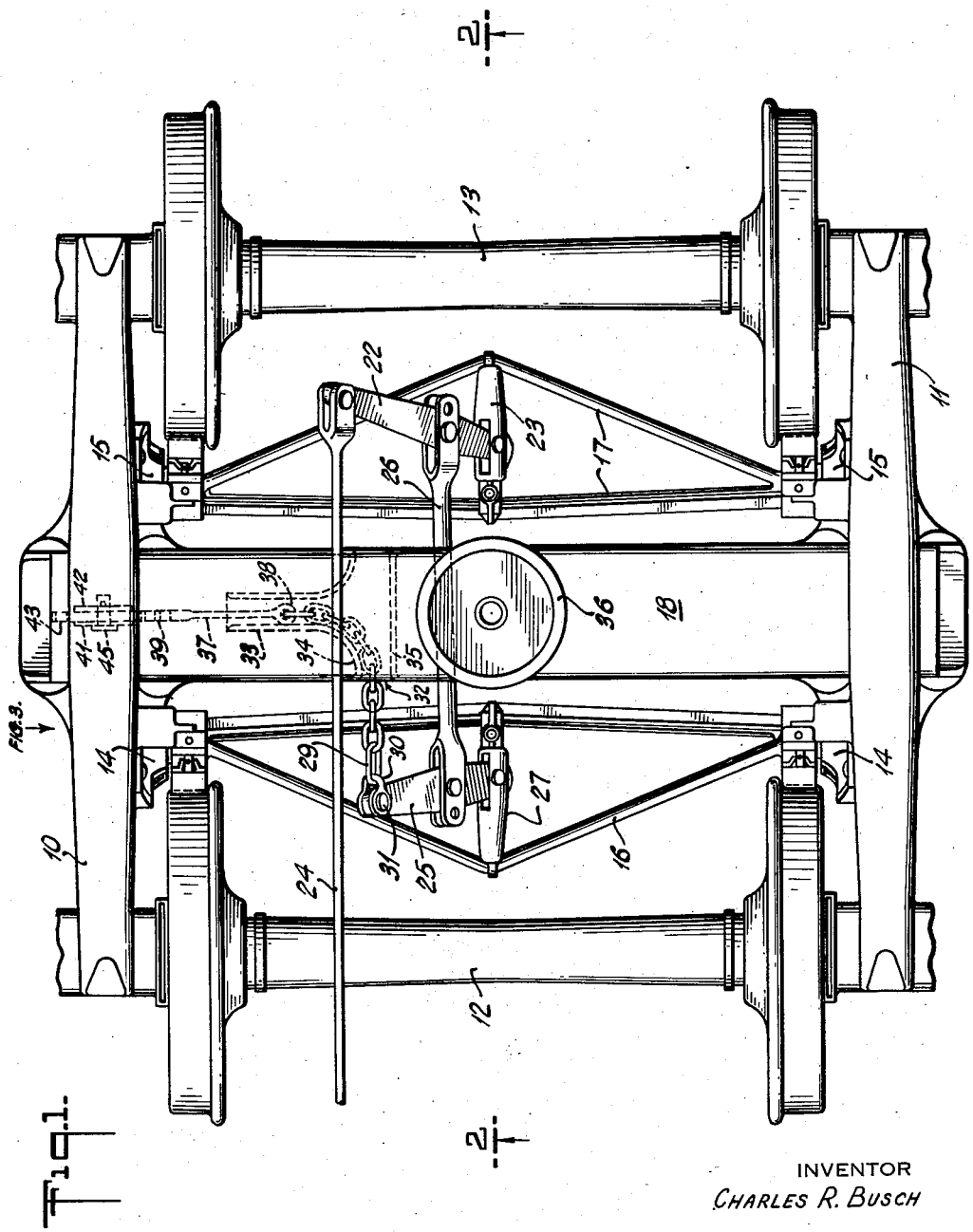
INVENTOR
CHARLES R. BUSCH
BY
Geo. L. Wheelock
ATTORNEY Aug. 8, 1950     C. R. BUSCH     2,518,120
SLACK ADJUSTER FOR BRAKES
Filed July 19, 1945     3 Sheets-Sheet 2
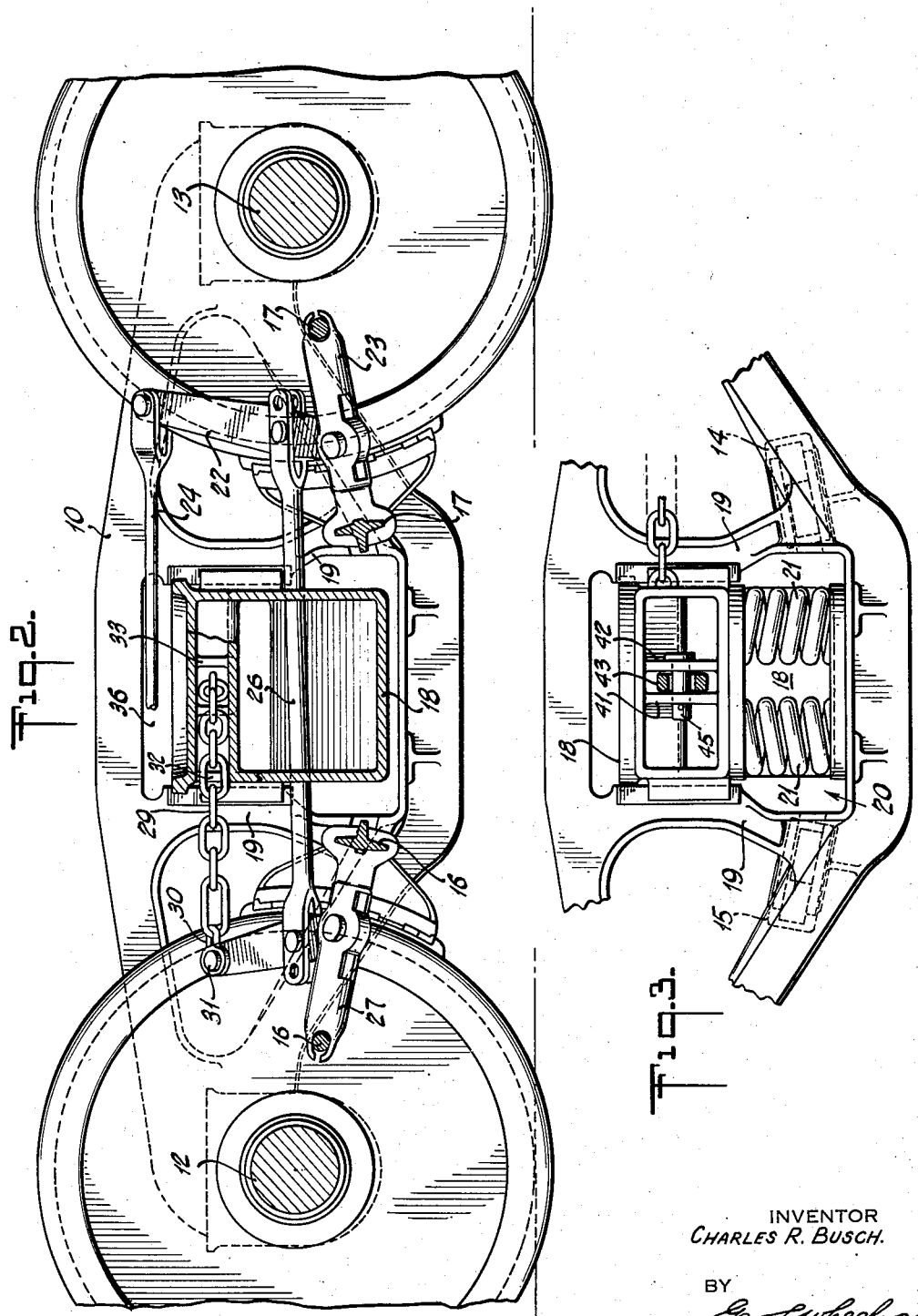
INVENTOR
CHARLES R. BUSCH.
BY
Geo. L. Wheelock
ATTORNEY

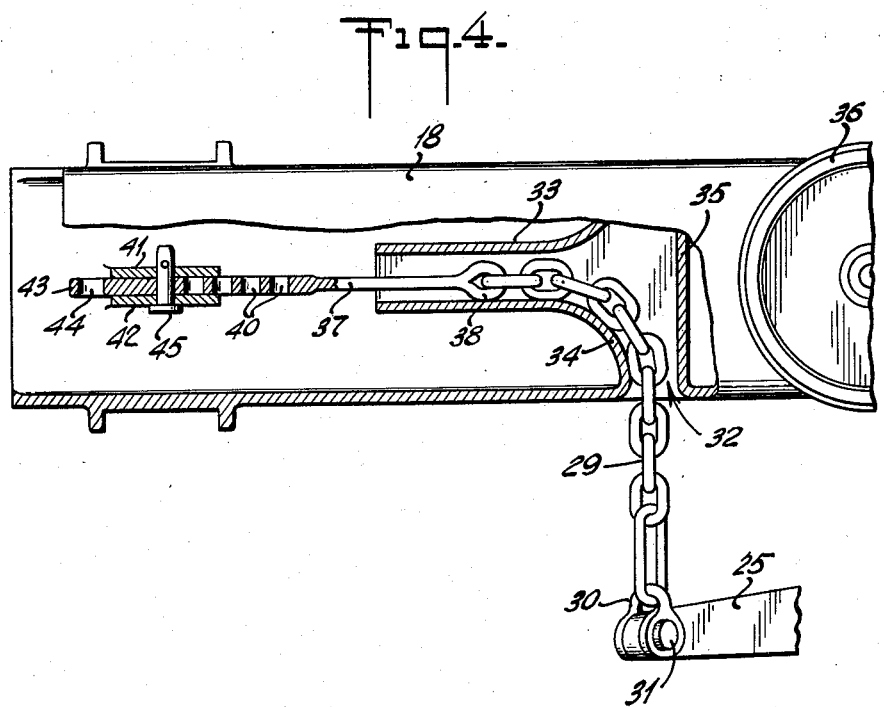

Patented Aug. 8, 1950

2,518,120

UNITED STATES PATENT OFFICE 2,518,120

SLACK ADJUSTER FOR BRAKES

Charles R. Busch, Orange, N. J., assignor to Buffalo Brake Beam Company, New York, N. Y., a corporation of New York Application July 19, 1945, Serial No. 605,951

14 Claims. (Cl. 188—197)

The present invention relates to slack adjusters for the truck brake-rigging of railway cars, more particularly but not necessarily applicable only to the dead levers of car trucks and to those trucks wherein the connecting rod between the live and dead levers preferably passes through an opening in the bolster.

Certain railroads require that such connecting rods pass through the bolsters so as to avoid the necessity of a bottom rod support, and one of the objects of this invention is to provide for the application of a simple slack adjuster to the dead lever in such manner that the connecting rod may pass through the bolster.

Independently of such requirement, but preferably in addition thereto, the present invention has the object that the unsafe practice of an operator going underneath or between cars to make any adjustment of the slack adjuster is eliminated, and therefore the slack adjuster hereof is preferably located at such a point of advantage that the operator has a clear view of the two brake beams on the truck when making the adjustments; that is, the operator may stand at one side of a car when making the necessary adjustments.

Furthermore, most of the freight car trucks which are now being supplied and in use have an increased spring travel for the bolsters of the car; that is, the spring travel formerly used was one and three-quarter inches, whereas now the extreme amount of spring travel generally required to be used is from three and one-half to four inches.

Hence, it is another object of the present invention to provide a slack adjuster which is adapted for use more especially where such increased spring travel is required, and so under this invention the slack adjuster is arranged on, or preferably within the bolster in such way that the anchorage therefor is actually in the end of the bolster, the dead lever guide of the adjuster extending direct from the bolster to the dead lever from a point laterally of the fulcruming end of the lever.

As will be obvious herefrom, the slack adjuster of the present invention is equally adapted for use in connection with brake beams of either the hanger supported type or that type which has more recently come into use, and in which type the brake beams are supported and guided by the side frames or side members of a car truck.

These being among those objects of the present invention which will be pointed out more in detail herein, the invention consists of certain features of construction and combinations of parts as herein described and then claimed, with reference to the accompanying drawings showing a preferred embodiment of the invention, and in which:

Fig. 1 is a top plan of a car truck, parts of the slack adjuster being shown in broken lines;

Fig. 2 is a longitudinal section on the line 2—2, Fig. 1;

Fig. 3 is a broken side elevation of Fig. 1 as it is viewed toward the left hand side frame of Fig. 1;

Fig. 4 is a top plan of one-half of a bolster, partly in section to show the slack adjuster partly in plan and partly in section; and Fig. 5 is a side elevation thereof, partly in section, as viewed from the dead lever.

The car truck illustrated in Figs. 1, 2 and 3 has side frames 10, 11, connected by the usual wheel-and-axle assembly 12, 13, and preferably each of the side frames or side members of the truck has inclined guides 14, 15, located adjacent the mutually presented lengths of the wheel treads for supporting and guiding the brake beams 16, 17, although obviously the latter may be supported in any well known manner to swing on the side frames from hangers.

Bolster 18 moves up and down on guide columns 19 in any well known manner within a window opening 20 in each side frame, except that the supporting springs 21 preferably allow a greater amplitude of movement of the bolster than the springs used in trucks for slow speed freight cars.

Live lever 22 is pivoted at its lower end on brake beam strut 23, it being operated by rod 24 from the air brake or hand brake mechanism of the car, and said lever being connected with the dead lever 25 by connecting rod 26 located intermediately of the ends of the two levers. The lower end of the dead lever is pivotally mounted on strut 27 of brake beam 16. Connecting rod 26 passes through an opening 28 in the bolster and which is large enough so as not to interfere with the movements of the bolster.

It being the basic object of the present invention to provide simple and reliable means to bring the truck brake rigging into proper position for the desired brake shoe clearance and travel of the piston of the air brake cylinder, the slack adjuster having such end in view will be described with reference to all of the figures of the drawings. And, it is to be clearly understood that certain features of the invention are applicable in connection with any known type of automatic or semi-automatic slack adjusters as well as to the special type shown and now described.

A dead lever guide is obtained by means of a chain or cable 29, or suitable flexible line, attached to a clevis 30 which is secured to the upper end of the dead lever 25 by a pin 31, to provide a fulcruming point for the dead lever, whether the brake beam to which this lever is pivoted is supported from hangers or from suitable guide-ways on the side frames or side members of the truck.

Flexible line 29 passes through a mouth or guidehole 32 and into a guide-way or trough 33, both of which are in the bolster 18, said guideway having a lateral portion 34 and fashioned to form an inward curve, so that the flexible line will be engaged along the curved wall of the guide-way, that length of the line which emerges from the bolster and extends directly to the dead lever being at substantially right angles to that length of the line which is within the portion of the said guide-way that extends longitudinally of the bolster.

The hole 32 and guide-way 33 are preferably cast on the bolster directly to and underneath the top wall thereof, as clearly shown in Figs. 3 and 5, and said guide-way may be of duplex construction in general T-shape, so that the head or cross portion portion 35 thereof may be provided with a guidehole such as 32 at each side of the bolster in order to be able to obtain either a right or left-hand application.

The lateral portion 34 or the head of the T-shaped guide-way, as the case may be, and the guide-hole 32 are arranged near to the centerplate 36 of the bolster and the enlarged hole 28 in the bolster, that is, close to a vertical plane transverse of the bolster and which intersects the centerplate and the hole 28 at their sides which are next to the guide-hole 32.

Within the bolster and positioned in the guideway 33 is located the inner end-portion or shank 37 of the slack adjuster, which is preferably a drop forging, and said end portion is connected by an eye 38 with the innermost link of flexible line 29 if this is in the form of a chain. Said shank 37 is integral with the outer end-portion 39 of the slack adjuster which is preferably a straight length of metal.

The shank 37 may be round or square or any suitable cross section, and the eye 38 may be forged or drilled therein. The outer end-portion 39 of the slack adjuster is formed flat or rectangular and of sufficient size to have a series of holes 40 therein which extend more or less in a horizontal plane, to open toward the opposite lateral sides of the bolster 18.

As the longitudinal part of guide-way 33 is preferably located midway of the opposite sides of the bolster and at its top, the slack adjuster 37, 39, will also extend longitudinally of and at the top of the bolster and midway of its sides, the perforated portion 39 extending between the adjacent end of guide-way 33 and the open outer end of the bolster.

Inside of the bolster there are cast integrally with it, or rivetted or welded thereto, a pair of juxtaposed, parallel, walls 41, 42, which extend from top to bottom of the bolster in vertical planes longitudinally thereof. These walls are spaced apart just sufficiently so that the perforated portion 39 of the slack adjuster can be inserted and closely positioned between them.

The outer end of the slack adjuster 37, 39, projects beyond the walls 41, 42, and is formed into a handle 43 having an aperture 44 therein, and preferably said handle is just within the open end of the bolster; and a hooked tool may be engaged with the handle or it may be engaged by the hand of the operator.

A pin 45 secures the slack adjuster to the walls 41, 42, that is to its anchorage, and it will be seen that this pin and the series of holes or perforations 40 in the slack adjuster, including the flexible connecting line 29 as a part of it, enables an operator to adjust the involved members of the brake rigging so as to provide as many fulcrum points for the dead lever as there are holes 40. This the operator can do from time to time as wear occurs on the brake shoes, by removing the pin, preferably in the form of a locking pin, from the walls 41, 42, and one hole 40 (say the first hole shown in Figs. 4 and 5) and engaging the pin through the next hole, and as further wear occurs repeating the operation.

When the handle 43 is pulled out to its extreme outer position beyond that shown, it will be well within the line of clearance of a freight car.

It is deemed important to preferably locate the anchoring means, such as the jaw-like walls 41, 42, for example, for the slack adjuster within the open end of the hollow bolster 18, not only because to do so provides a safe vantage post for the operator at the side of the car, rather than in a dangerous position between cars or under a car, but the open end of the bolster provides a protecting hood around the perforated member 39, the securing pin 45 and the anchorage 41, 42, especially in the entire enclosed space around such elements, thereby protecting them against rain, snow and dirt.

Furthermore, by anchoring the slack adjuster to the bolster it will always have the same position as the bolster, which is of especial importance in connection with the modern high speed freight cars on which the bolsters may have an up and down range of movement up to three and one-half or four inches, but this slack adjuster is nevertheless important with a bolster no matter what the range of its movements may be.

In order that the advantages and functions of the specific embodiment of the invention illustrated in the drawings, especially Fig. 1, may be fully understood, they show the slack in the brake rigging as having been taken up when the brake is applied to the wheels so that the brake shoes are set against them, at which time the flexible line 29 is shown to be in tension. This will be the case when the brake beam on the dead lever is below the connecting rod 26 of the live and dead levers.

The portion of the flexible line 29 which lies between the fulcrum point at the upper end of the dead lever 25 and the bolster, when the slack in the brake rigging is adjusted by taking it up, provides a dead lever guide which is located between and substantially parallel with the pull rod 24 and the connecting rod 26, Fig. 2. The length of such portion of line 29 providing the dead lever guide, when the guide is in tension as shown, extends in a straight line, preferably for substantially the shortest distance between that side of the bolster nearest the dead lever and the pivot 31 of clevis 30, which constitutes the terminal of the flexible line and also the fulcrum for the upper end of the dead lever; the anchorage means for the adjusted line being on the bolster. Such a flexible guide is itself possible when the anchorage therefor is on the bolster.

Instead of making the adjustment by hand controlled or hand regulating means it will be obvious to those skilled in the art that any known type of automatic or semi-automatic control or regulating means may be substituted for making the adjustment, in which case the latter means would be connected with a flexible line forming part of the slack adjuster which is anchored to the outer end of the bolster, while the flexible line would be guided to the dead lever similarly to what is shown and described; and it also will be obvious to those skilled in the art that such and other changes and modifications can be resorted to as are within the spirit or principles of the present invention and the scope of the appended claims.

What I claim as new and desire to secure by Letters Patent is:

1. In combination with the truck brake rigging of a railway car, a slack adjuster including regulating means and a flexible connecting line, secured at one end to the dead lever of the rigging and at the other end secured to the regulating means, and a truck bolster within an outer end of which the regulating means is mounted, the bolster having a guide hole through which the flexible line is guided.

2. In combination with the truck brake rigging of a railway car, a slack adjuster including regulating means and a flexible connecting line, secured at one end to the dead lever of the rigging and at the other end secured to the regulating means, and a truck bolster within an outer end of which the regulating means is mounted, the bolster having a guide hole through which the flexible line is guided, and the bolster having an interior guide-way for the flexible line.

3. In combination with the truck brake rigging of a railway car comprising a dead lever, a truck bolster having an interior passage for a slack adjuster, and a flexible line forming a slack adjuster anchored in the passage and extending out of the bolster directly to the dead lever for substantially the shortest distance between the bolster and dead lever.

4. In combination with the truck brake rigging of a railway car, a truck bolster, a slack adjuster connected with the dead lever of the rigging and having regulating means located in the outer end of the bolster, and the connection between the regulating means and dead lever being flexible and guided within the bolster.

5. In combination with the truck brake rigging of a railway car, a slack adjuster having regulating means and connected with the rigging, a truck bolster, and mounting means enclosed in an end of the bolster whereto the regulating means is anchored, the mounting means being accessible from the corresponding side of the car truck.

6. In combination with the truck brake rigging of a railway car, a truck bolster, and a slack adjuster connected with the dead lever of the rigging and guided in the bolster, and mounting means on the end of the bolster, the slack adjuster including regulating means anchored to the mounting means.

7. In combination with the truck brake rigging of a railway car, a truck bolster, and a slack adjuster connected with the dead lever of the rigging and guided in and along the bolster, and mounting means on and adjacent the end of the bolster, the slack adjuster including regulating means anchored to the mounting means and accessible through the window opening of the corresponding side frame of the truck.

8. In combination with the truck brake rigging of a railway car, a hollow truck bolster having an end opening and a side opening, a flexible line in the bolster extending out through the side opening and connected with a lever of the rigging, and accessible means in the end opening acting on the flexible line to regulate the position of the lever.

9. In combination with the truck brake rigging of a railway car, a hollow truck bolster having an end opening and a side opening, a flexible line in the bolster extending out through the side opening and connected with a lever of the rigging, accessible means in the end opening acting on the flexible line to regulate the position of the lever, and a guide-way in the bolster supporting and guiding the flexible line and having a laterally deflected portion leading to the side opening.

10. A railway car truck bolster adapted to receive and laterally guide a slack adjuster for the truck brake rigging of the car, the bolster having a lateral guide opening, mounting means in an accessible outer end of the bolster, and a regulating portion for the slack adjuster secured in such end to the mounting means and adjustable thereon longitudinally of the bolster.

11. A railway car truck bolster adapted to inwardly receive and laterally guide a slack adjuster for the truck brake rigging of the car, the bolster having mounting means fixed within an outer end thereof and adapted for the anchoring thereto of a regulating portion of the slack adjuster, and a lateral wall of the bolster having a hole intermediately of its length adapted to guide another portion of the slack adjuster therethrough.

12. A railway car truck bolster adapted to receive and guide a slack adjuster for the truck brake rigging of the car, the bolster having mounting means at an outer end adapted for the anchoring thereto of a regulating portion of the slack adjuster, and inwardly of such end a lateral wall of the bolster having a hole adapted to guide another portion of the slack adjuster therethrough, and a guide-trough in the bolster leading to the hole and adapted to guide the slack adjuster to said hole.

13. A railway car truck bolster having a lateral opening and within it a slack adjuster guide-trough presented toward an outer end of the bolster, such trough formed in part with the top of the bolster and having a lateral portion curved outwardly to the lateral opening for guiding the adjuster around the curve and out through the lateral opening.

14. A slack adjuster for the brake rigging of a railway car truck, including the combination of a truck bolster, a connecting rod between intermediate portions of the live and dead levers of the rigging and passing through the bolster transversely thereof, a brake beam on each lever below the connecting rod, anchorage means within an outer end of the bolster, a flexible line guided in the bolster and out through a lateral side thereof, the line having a portion outside of the bolster connected with the dead lever at a point above such connecting rod and providing a dead lever guide for the fulcruming of the lever, the flexible line adjustably anchored to the anchorage means and regulating the length of the dead lever guide for the whole distance between such bolster side and the fulcrum of the dead lever, the line under tension when the slack in the brake rigging is taken up.

CHARLES R. BUSCH.

REFERENCES CITED

The following references are of record in the file of this patent:

UNITED STATES PATENTS

| Number | Name | Date |
| --- | --- | --- |
| 1,133,667 | Ransom | Mar. 30, 1915 |
| 1,192,420 | Harter et al. | July 25, 1916 |
| 1,951,075 | Wine | Mar. 13, 1934 |
| 2,029,822 | Hedgcock | Feb. 4, 1936 |
| 2,096,487 | Farmer | Oct. 19, 1937 |
| 2,181,041 | Baselt | Nov. 21, 1939 |
| 2,276,065 | Schaefer | Mar. 10, 1942 |
| 2,367,586 | Kelley | Jan. 16, 1945 |